(12) United States Patent
Bauchot et al.

(10) Patent No.: US 7,856,417 B2
(45) Date of Patent: Dec. 21, 2010

(54) METHOD AND SYSTEM FOR FILING ELECTRONIC MAILS

(75) Inventors: Frederic Bauchot, Saint-Jeannet (FR); Beatrice Coulomb, Cagnes sur Mer (FR); Gerard Marmigere, Drap (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 11/754,720

(22) Filed: May 29, 2007

(65) Prior Publication Data

US 2008/0091734 A1 Apr. 17, 2008

(30) Foreign Application Priority Data

Oct. 12, 2006 (EP) .................................. 06301044

(51) Int. Cl.
*G06F 17/00* (2006.01)
(52) U.S. Cl. ........................ 707/613; 707/718; 707/928; 707/999.002; 455/412.1
(58) Field of Classification Search ................. 707/609, 707/613, 705, 718, 928, 999.005, 999.009; 455/412.1
See application file for complete search history.

(56) References Cited

U.S. PATENT DOCUMENTS

2004/0242205 A1* 12/2004 Yamane et al. ............ 455/412.1

OTHER PUBLICATIONS

Gerald E. Boyd, Everything by E-mail Web Page, www.expita.com, Sep. 13, 2003. Copyright 1997-2003. pp. 1-3.
Gerald E. Boyd, Tracking E-mail- Part 1, www.expita.com,/header1.html, Mar. 3, 2003. Copright 2001-2003. pp. 1-28.

* cited by examiner

*Primary Examiner*—Fred I Ehichioya
(74) *Attorney, Agent, or Firm*—Scully, Scott, Murphy & Presser, P.C.; William H. Steinberg, Esq.

(57) ABSTRACT

A method and system for filing electronic mails is disclosed. The method executed on the client side of a mail application allows to propose to a user a list of relevant folders that have been previously used to store e-mails in relation with the current e-mail to be stored. The relationship between the e-mail is determined by analyzing the content of different message fields of the e-mail header.

14 Claims, 7 Drawing Sheets

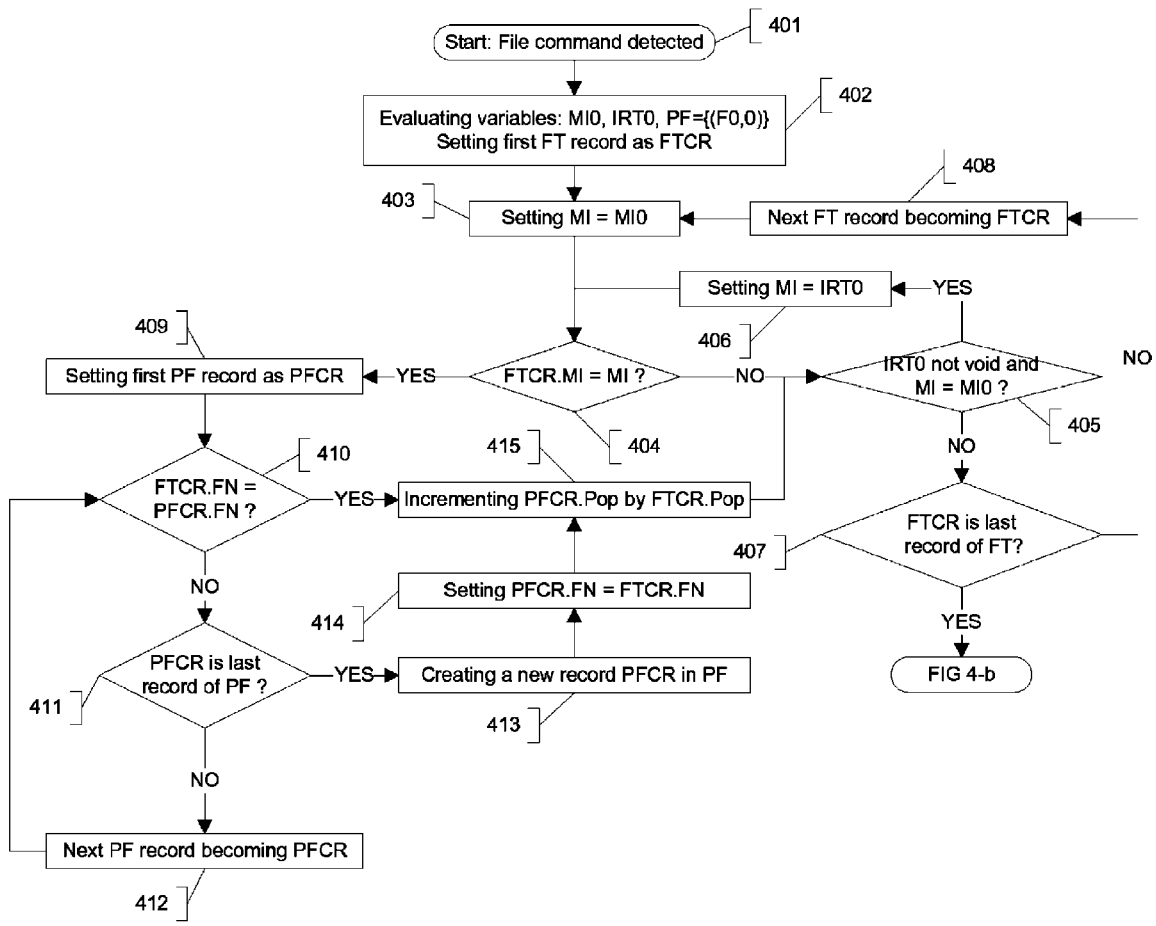
FIG 4-a

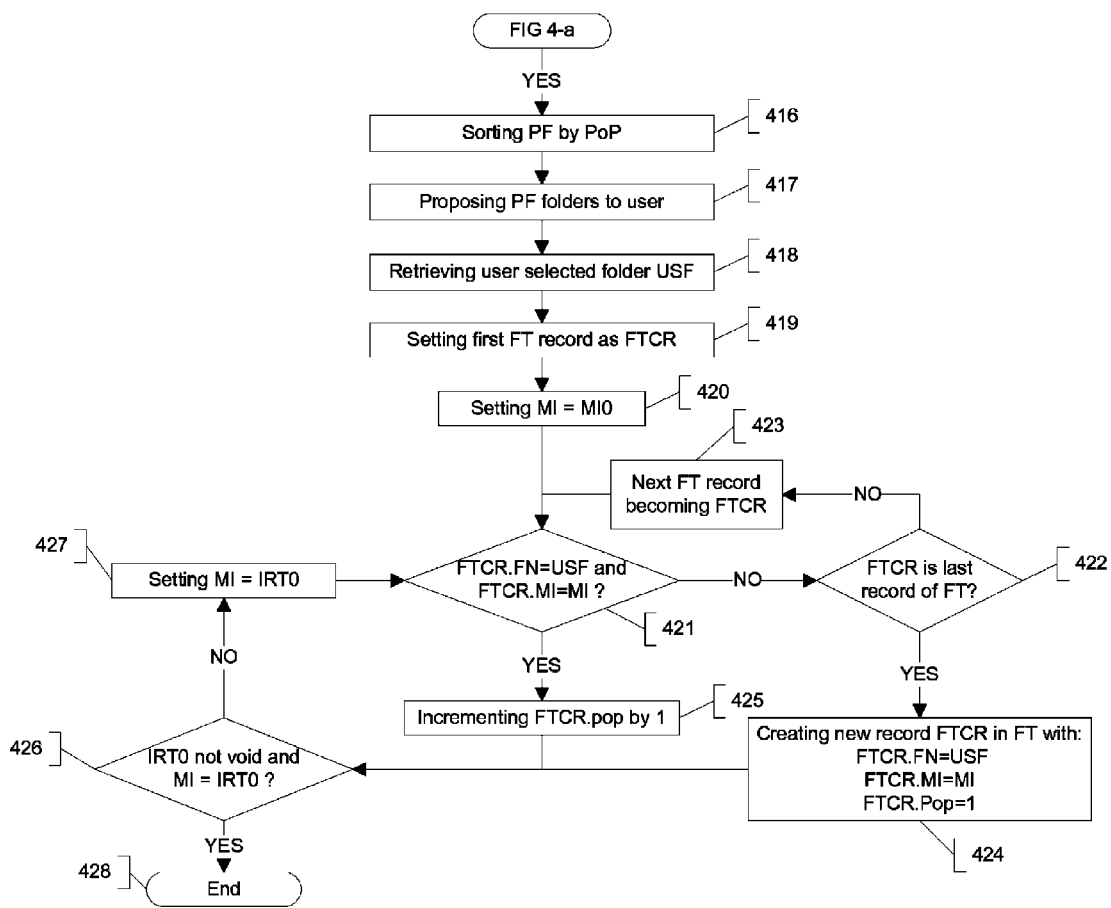
FIG 4-b

METHOD AND SYSTEM FOR FILING ELECTRONIC MAILS

FIELD OF THE INVENTION

The present invention generally relates to the field of computer-based mail or electronic mail and more particularly to a system, method and computer program for classifying electronic mails.

BACKGROUND OF THE INVENTION

In today's networking environment, electronic mail or e-mail is widely used by almost anyone having a computer device. Most of mail systems are based on Internet standards, the main standards being the Post Office Protocol (POP as defined in the Request For Comment RFC1939) for receiving e-mail and the Simple Mail Transport Protocol (SMTP as defined in the RFC2821) for sending e-mail.

On the basis of the SMTP model, a user who generates a mail composes the text of the message and provides additional information in specific fields of the header of the message, such as the destinations) (namely the To, Cc, Bcc fields) or the subject-matter (namely the Subject field).

Once a mail is sent or received by a user, this latter may wish to store it in order to be able to retrieve it easily later on. The electronic mail systems generally used the so-called mail folders to record the mails. Such mail folders are very convenient for organizing and structuring all the mails that user may either have received or sent. Furthermore structured and nested mail folders allow to quickly access mails, for instance based on the topic they relate to.

A first typical scenario happens when a mail is sent by a user. After completion of the mail edition, the user can select a "Send and File" function in order to send the mail to the specified destination(s) and to file (or record) it within a mail folder. For this purpose, the user have to select the folder within which he/she wants to file the mail.

A second typical scenario happens when a mail is received by a user. The received mail is normally found in an "in-basket" generic folder. When the user has read the mail and he/she wants to file it in a specific folder, for future easy access or for limiting the size of an ever growing in-basket folder, he/she is prompted for specifying which folder where to file the received mail.

In these two scenarios, the user is always prompted for specifying a folder where to file a mail. With the conventional mail systems, there exist different means to assist the user in the mail folder selection, as outlined below.

Simple mail systems propose a default folder which is always the same. The limitation of such systems is clearly that the classification is a very basic one and that there is no real help provided to the user.

Other frequent systems propose the folder which was selected during the most recent operation. This approach is only relevant for situations where a user treats a sequence of mails that relate to the same subject, hence worth being filed in the same folder. Again, the help provided to the user remains very limited.

More sophisticated mail systems use filtering techniques which were originally introduced to face the explosion of spamming. Such techniques, as for instance the one implemented in the "Mailbox Filter" product of Triumvirate Technologies Inc., rely on the address of the sender or on the mail subject in order to identify the most relevant folder(s) where to file a mail. This brings much further value than the previous listed systems, but presents nevertheless important limitations, as outlined below:

A filtering criteria based on the sender address asks for an important rule management for taking into account any unknown address;

A filtering criteria based on the sender address is not well suited for a mail user who communicates with a limited number of peers or either has a great majority of his/her mails exchanged with a limited numbers of peers;

A filtering criteria based on the mail subject is sensitive to typos; and

A filtering criteria based on the mail subject is language specific.

Thus, there is a need not answered by the existing mail systems to provide a solution to assist a user in the selection of a folder location where to store a mail.

The proposed invention aims to address this need with a method and system which relies on the potential relationships existing between exchanged mails. As it will be further described, the mail message header includes information on the sender plus information related to the exchanged mails that offers support for linking a mail to a specific storage location.

SUMMARY OF THE INVENTION

Therefore, it is an object of the present invention to provide a system and a method which overcome the above issues of the prior art. This object is achieved by combination described in the independent claims. The dependent claims define further advantageous and exemplary combinations of the present invention.

According to a first aspect of the present invention, a computer implemented method of filing an electronic mail (e-mail) comprises the steps of:

detecting an instruction from a user action to file the e-mail;

extracting the content of at least one message field from the header of the e-mail;

using the extracted content as a message identifier to search into a folder table for one or more records associated to the same message identifier, each record of the folder table being defined by a folder name and a message identifier; and displaying a proposed folder list as being a result of relevant folders where to file the e-mail, the list including the folder name of each record found.

Preferably, the content extracted from the message header is the content of the message-id field and of the reply-to field.

In an alternative implementation, computer readable program means to operate the steps of the aforementioned method is embodied on a program storage device that is readable by a computer machine.

BRIEF DESCRIPTION OF THE DRAWINGS

FIGS. 4-a and 4-b illustrate flowcharts of the process for identifying a relevant folder where to file a mail according to the preferred embodiment.

DETAILED DESCRIPTION

Figure 1:
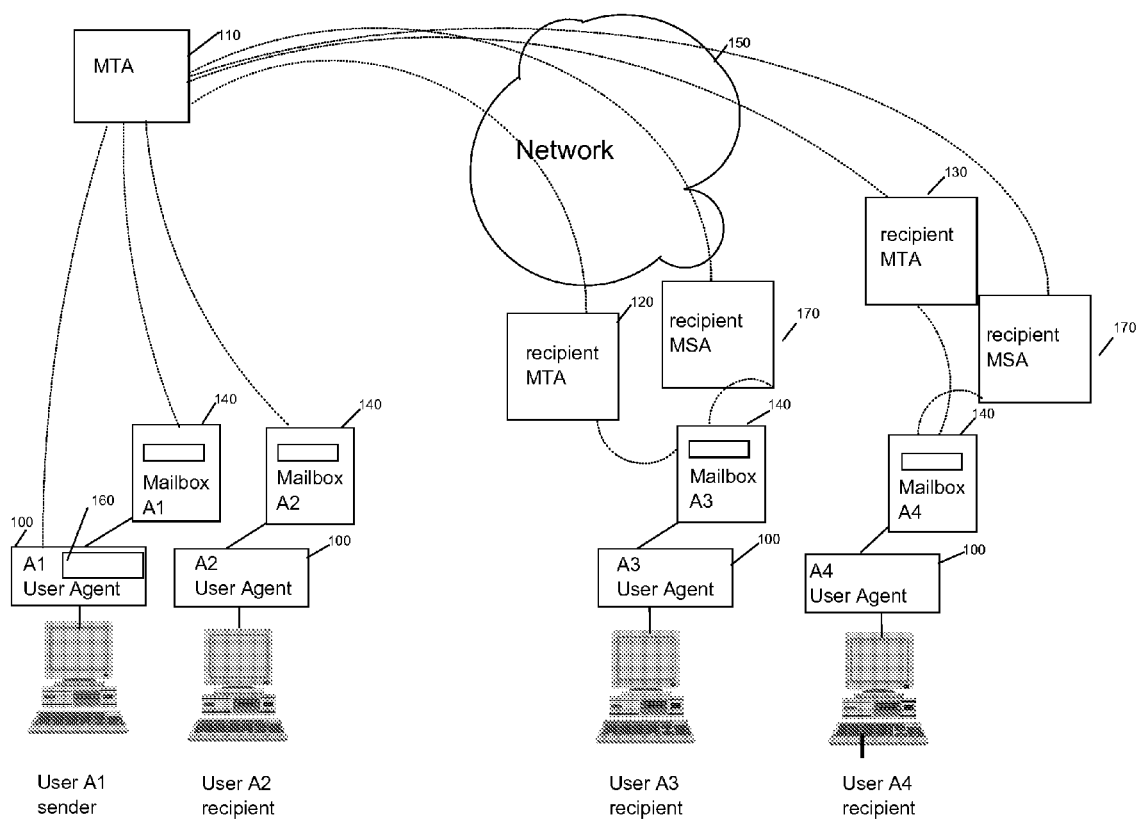
FIG. 1 illustrates the computing environment to operate the method of the invention according to the preferred embodiment.

Before referring to the figures, some general considerations on the terms used in the description and on the advantages of the present invention are first highlighted.

The protocols governing the exchange of mails have defined a list of formal fields that must or could appear in the header of a mail, depending on the stage of the sending or receiving mailing process. Those fields are identified by specific keywords such as for example the most known 'from:' or 'to:' or 'subject:' ones. A complete list of those such well-known fields may be found for example at http://www.expita.com/.

For the purpose of the present description, the following particular keywords are more detailed:

The "In-Reply-To" field is used in reference to a previous message which the current message is a reply to. The content of this field identifies previous correspondence which this message answers, as exemplified below:

In-Reply-To: <75437062.9841469@angebrain> of Fri, 9 Mar. 2001 13:24:29-0500 or

In-Reply-To: <2001031322.WAA28920@listserv.aol.com> or

In-Reply-To: <000b01c0aa2f$28426a80$212ed8@win98>

The "Message-ID" field (also Message-Id: or Message-id:) is like a serial number and contains a unique identifier (the local-part address unit) which refers to the current version of the current message. The uniqueness of the message identifier is guaranteed by the host which generates it. A message identifier pertains to exactly one particular message and subsequent revisions to the message receive each new message identifiers. Several examples are listed below:

Message-ID: <02ba01c07ad8$898fc840$c9000a@checkoway.com> or

Message-ID: <d5.4731683.27f944@aol.com> or

Message-ID: <3AC8A28B.27099.198FF5@localhost>

The "References" field: The content of this field identifies other correspondence which the current message references, as for example:

References: <01a901c0a72a$42237960$610ca8c@hostel1.giki.edu.pk> or

References:<OIBBLIKONCNJJLNL.linda@pers-computer-tutor.com>

The general principle of the present invention is to use the content of these fields to extract the relationships between different mails and to leverage these relationships to determine the better choice of a folder where to file a mail.

This can be first illustrated by the following simple scenario involving three users A, B and C:
1. User A sends a first mail "mail#1" to user B, copying user C;
2. User C receives mail#1 and files it in a folder F1;
3. User B receives mail#1 and responds to this mail by issuing a reply mail "mail#2" directed to user A, copying user C;
4. User C receives mail#2. The process of the present invention allows to correlate mail#1 with mail#2, retrieving where mail#1 has been filed (folder F1) and then issuing a proposal to user C to file mail#2 in same folder F1 as being the most relevant filing location.

Similar processing may be applied to other situations and scenarios for taking advantage of the proposed invention, and for example in situation to determine:

Where will user A file mail#2, assuming he/she has already filed mail#1? or

Where will user B file mail#2, assuming he/she has already filed mail#1?

Thus, as illustrated hereinabove, the present invention allows for identifying relevant folders to file mails in an electronic mail system.

Moreover, the present invention is of an easy implementation as only the client mail application (called the "User Agent" in the SMTP environment) of the sender is modified. Thus, the implementation remains transparent for:

the mail server application;

the local Mail Transfer Agent, in charge of transferring electronic mail messages over the network according to SMTP; and for the client mail application of the recipient.

Referring to FIG. 1, an electronic mail configuration based on the SMTP protocol is shown as a preferred environment to operate the invention. Generally, a message store agent (MSA) collects incoming mail and places it in a message storage device (Mailbox). A mail user agent (MUA) reads the messages stored in the message storage device and presents an interface to an external user. When the user wishes to transmit mail, the message is composed using the MUA and passed to a message transfer agent (MTA) that insures the mail is correctly addressed and packaged for transport on a communication network. Some variations may exist with other electronic mail systems that may include a mail sent to devices that are intermittently connected to the network. In such systems, the MUA is replaced with a mail server that services requests over an intermittent line from a mail proxy device. At the request of the mail proxy device, a copy of the mail in the message storage device is copied to a storage device of an off-net machine. The mail server then proceeds in a similar manner to that described above and the elements in the mail server, including the message storage device and the MTA function as previously described. Outgoing mail may be formatted for delivery on the off-net machine and delivered via mail proxy to the mail server for delivery to the communication network. Transactions between the off-net machine and the mail server on a machine that is continuously on the network occur only when the connection is active. However, whatever the mail system, the present invention operates similarly.

As shown on FIG. 1, User Agents A1, A2, A3, A4 (all denoted 100) operating in users' workstation act as clients for their respective mail servers (110, 120, 130) (the so called Mail Transfer Agents MTAs). In the present example, User Agents A1 and A2 are connected to a local common MTA (110) while User Agents A3 and A4 are each connected to a respective MTA (120, 130). The MTAs are in charge of managing the recipient mail addresses for sending and receiving mails either to or from the local User Agents. The local User Agents (A1, A2) are connected to the local MTA (110) which this latter is connected over the Internet network (150) to remote MTAs (120, 130). The remote MTAs transfer and receive mails either to or from the local User Agents (A3, A4) connected to them.

A User Agent sends a mail to its local MTA. This mail comprises the data itself and the names of the recipients. To deliver a mail to a local User Agent, a MTA looks for the addresses of the recipients and puts the mail in a mail repository (mailbox 140) of the User Agent receiving the mail. The sender and recipient names correspond to the mailboxes of the senders and recipients.

According to the preferred embodiment of the present invention, a specific folder selection function (160) is added to the mail client application (100) implementing SMTP. By means of this additional function, a user is offered assistance for identifying a folder where it is relevant to file a mail.

Figure 2:
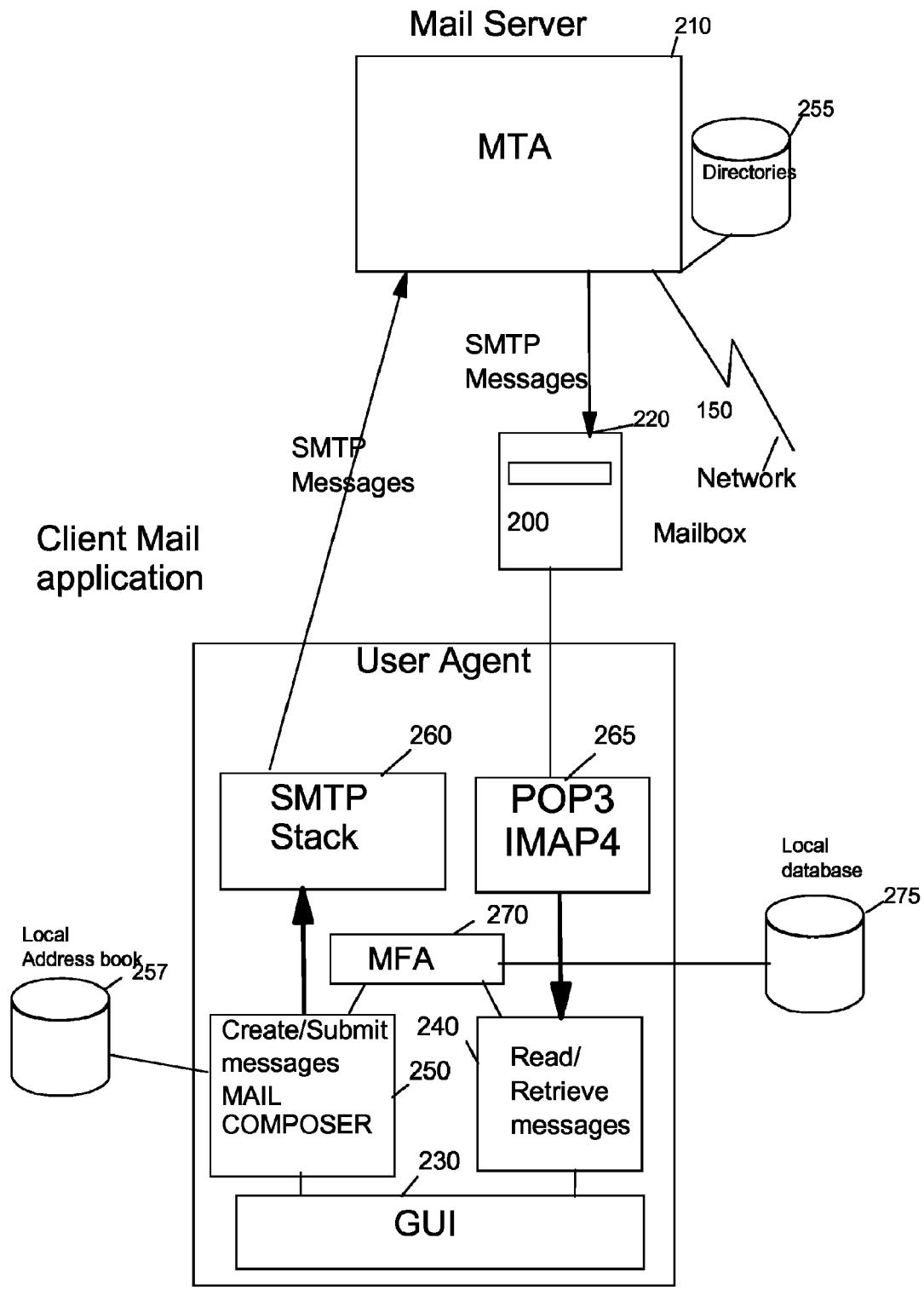
FIG. 2 is a logical view of a client mail application according to the invention.

Going now to FIG. 2, details of a mail user agent 100 comprising the folder selection function is explained. Mail user agent is composed of the following block functions:

1

A "Create Message" function (250) used to compose, by means of an editor, the mails and the distribution lists. This function has access to directories (255) stored on a local or a remote MTA, or to directories directly on a Local Address Book (257) (which is the local space of the user).

A "Submit Message" function (250) that translates a message to be compliant with the "Internet Message Format" RFC2822.

A SMTP Stack (260) that receives the message formatted by the "Submit Message" function. This formatted message is ready to be submitted to the MTA via SMTP.

A "Read/Retrieve Messages" function (240) used to have access to the messages stored in the Mailbox (220). The protocols (265) used to access the mail box may be either the Post Office Protocol POP3 as described in the RFC 1939 and updated by the RFC 1957 and the RFC 2449 or the Internet Message Access Protocol IMAP4 as described in the RFC 3501.

A "Mail File Agent" MFA function (270) that allows to file the sent or received mails in a folder chosen by the user and to keep trace of the user selected folder. A local database (275) allows to record the mails and the folder tables to be used by the method of the present invention. The local database may be indifferently replicated on the mail server to which the user belongs to.

A "Graphical User Interface" GUI (230) to interact with the user.

Figure 3:
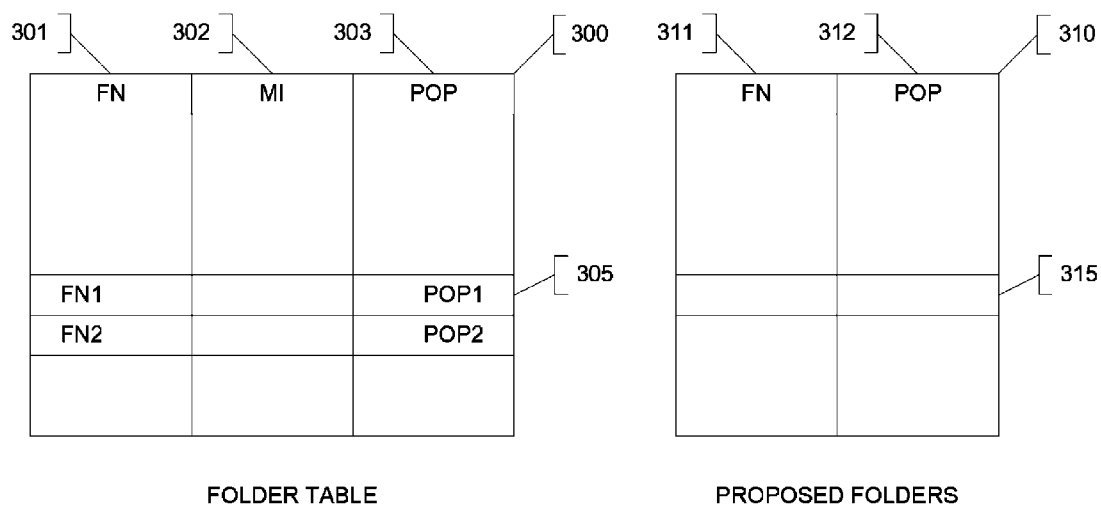
FIG. 3 illustrates the structure of the folder table and of the folders array according to the preferred embodiment of the present invention.

FIG. 3 illustrates the general structure of a Folder table 300 (FT for short) and of a Proposed Folders table 310 (PF for short).

The Folder table 300 is structured as a set of records (305), each record corresponding to a folder and arranged in a sequence of fields, namely:

a first "Folder Name" field FN1 (301) indicating the name of the folder the current record points to;

a "Message Identifier" field MI (302) containing an identifier associated either to a "Message-Id" keyword or to a "In-reply-to" keyword; and a first "Population" field POP1 (303) containing the number of mails associated to this record.

The Proposed Folders table 310 is structured as a set of records (315), each record corresponding to a proposed folder and arranged in a sequence of fields, namely:

a second "Folder Name" field (311) FN2 indicating the name of the folder this record points to; and a second "Population" field POP2 (312) containing the number of mails associated to this record.

Going to FIGS. 4-*a* and 4-*b*, a flow chart showing the steps of the method for determining a relevant folder where to file a mail is now described.

On step 401, the method starts when a File command input by a user is detected. This command is associated to a mail referred to as the current mail or CM for short.

On step 402, several computing variables are evaluated. These are:

a variable MI0 taking the value of the identifier associated to the "Message-Id" keyword found in the CM;

a variable IRT0 taking the value of the identifier associated to the "In-Reply-To" keyword if it exists in the CM or being left to "void" if the "In-Reply-To" keyword is absent from the CM; and the Proposed Folder table PF is initialized for a single record with field FN2 equal to a default folder F0 and field POP2 equal to 0 (zero). A local variable named Folder Table Current Record (FTCR for short) is set equal to the first record of the Folder Table FT 300.

On step 403, a local variable MI is set equal to MI0.

On step 404, a test is performed to check if the Message Identifier field 302 for the local variable FTCR is equal to the local variable MI. If it is the case (branch Yes), then control is given to step 409; otherwise (branch No) control is given to step 405.

On step 405, a test is performed to check if the variable IRT0 is not void and if the variable MI is equal to MI0. If it is the case (branch Yes), then control is given to step 406; otherwise (branch No) control is given to step 407.

On step 406, the local variable MI is set equal to IRT0, and control is given to step 404.

On step 407, a test is performed to check if the local variable FTCR is the last record of the Folder Table FT 300. If it is the case (branch Yes), then control is given to step 416, otherwise (branch No) control is given to step 408.

On step 408, the local variable FTCR is set equal to the next record 305 of FT and the process loops to step 403.

Going back to step 409, a local variable named Proposed Folder Current Record (PFCR for short) is set equal to the first record 315 of the Proposed Folder table 310.

Next, on step 410, a test is performed to check if the Folder Name field 301 of the local variable FTCR is equal to the FN field 311 of PFCR. If it is the case (branch Yes), then control is given to step 415; otherwise (branch No) control is given to step 411.

On step 411, a test is performed to check if the variable PFCR is the last record of the Proposed Folder table. If it is the case (branch Yes), then control is given to step 413; otherwise (branch No) control is given to step 412.

On step 412, the local variable PFCR is set equal to the next record of the PF table and the process loops to step 410.

On step 413, a new record 315 is created in the PF table, and the local variable PFCR is set equal to this new record.

On step 414, the FN field (311) of PFCR is set equal to the FN field (301) of FTCR.

On next step 415, the POP field (312) of PFCR is incremented by the POP field (303) of FTCR and the process returns to step 405.

Going back to test of step 407, in the case the last record is reached (branch Yes), then the process pursues with step 416 as shown on FIG. 4-*b* where the Proposed Folders table (310) is sorted on the POP fields to have the first record holds the highest POP value.

Next, on step 417, the folders found in the PF table are proposed to the user as relevant candidates for filing a mail. This is preferably through a user interface dialog box that is not detailed here, but of a common implementation for the man skilled in the art.

Once the user has chosen a preferred folder, step 418 allows to retrieve this latter under the name User Selected Folder or USF for short.

Next, on step 419, the local variable FTCR is set equal to the first record of the FT table, and on step 420, the local variable MI is set equal to MI0.

A test is performed on next step 421 to check if the FN field of the variable FTCR is equal to the selected folder USF and if the MI field of FTCR is equal to MI. If it is the case (branch Yes), then control is given to step 425; otherwise (branch No) control is given to step 422.

On step 422, a new test is performed to check if the variable FTCR is the last record of the FT table. If it is the case (branch Yes), then control is given to step 424; otherwise (branch No) control is given to step 423.

On step 423, the local variable FTCR is set equal to the next record of the FT table and the process loops to step 421.

On step 424, a new record is created in the FT table and initialized with the FN field equal to USF, the MI field equal to MI and the POP field equal to 1. The local variable FTCR is set equal to this new record. Then the process pursues with step 426.

Going back to step 421, in case the test result is positive (Branch Yes), then on step 425, the POP field of FTCR is incremented by 1 and the process goes to step 426.

On step 426, a new test is performed to check if IRT0 is not void and if it is equal to MI. If it is not the case (branch No), then control is given to step 427 to set the local variable MI equal to IRT0 and the process loops to step 421, otherwise (branch Yes) the process ends (step 428).

Figure 5:
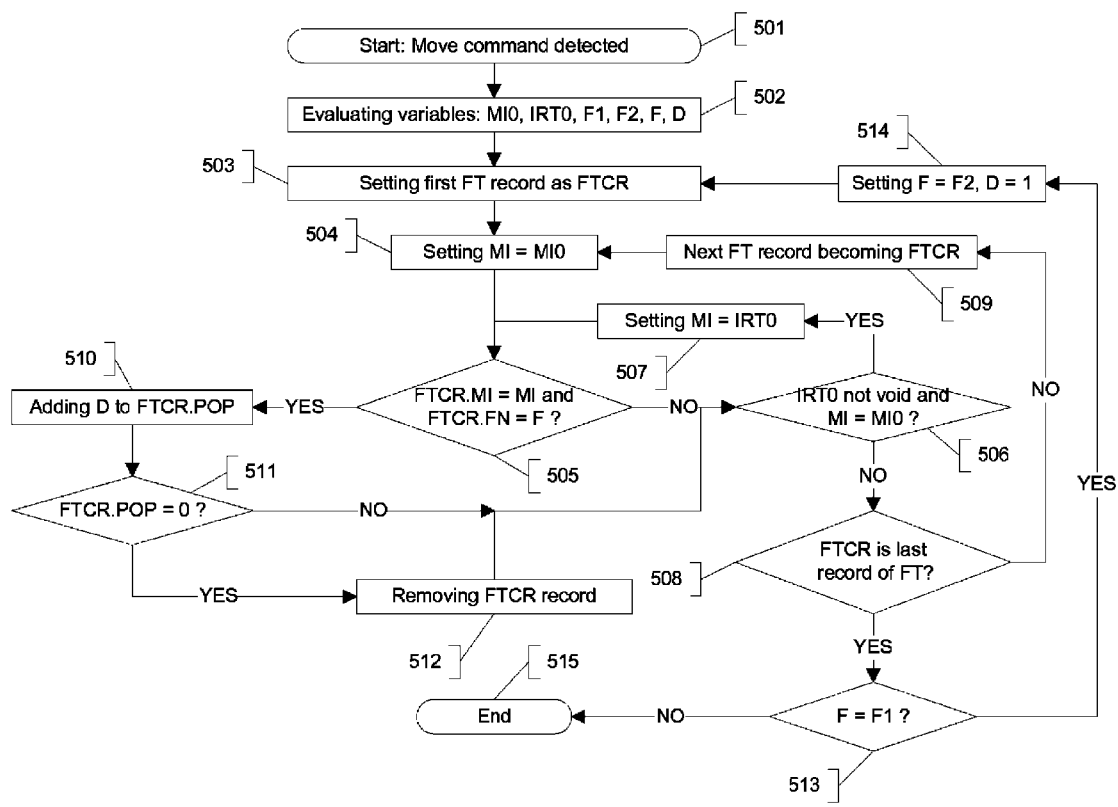
FIG. 5 is a flowchart of the process for moving a mail from one folder to another one according to a preferred embodiment.

Going now to FIG. 5, a flow chart of the steps of the method for moving a mail from one folder to another one, according to the present invention, is described.

The process starts on step 501 when a Move command initiated by a user is detected. This command is associated to a mail referred to as the current mail or CM for short.

On step 502, several variables are evaluated or initialized, as follows:

variable MI0 which corresponds to the identifier associated to the "Message-Id" keyword found in CM;

variable IRT0 which corresponds to the identifier associated to the "In-Reply-To" keyword if it exists in CM or which is left to "void" if the "In-Reply-To" keyword is absent in CM;

a variable F1 taking the value of the folder name where CM is stored;

a variable F2 taking the value of the folder name where CM is to be moved to;

a variable F set to F1; and a variable D set to "−1" (minus one).

On next step 503, a local variable named Folder Table Current Record or FTCR for short is set equal to the first record of the FT table, and on step 504, the local variable MI is set equal to MI0.

On step 505, a test is performed to check if the MI field of the variable FTCR is equal to the local variable MI and if the FN field of the variable FTCR is equal to F. If it is the case (branch Yes) then control is given to step 510, otherwise (branch No) control is given to step 506.

On step 506, a test is performed to check if IRT0 is not void and if MI is equal to MI0. If it is the case (branch Yes), then control is given to step 507; otherwise (branch No) control is given to step 508.

On step 507, the local variable MI is set equal to IRT0. Then control is given to step 505.

On step 508, a new test is performed to check if the variable FTCR is the last record of FT table. If it is the case (branch Yes) then control is given to step 513, otherwise (branch No) control is given to step 509.

On step 509, the local variable FTCR is set equal to the next record of the FT table, and the process loops to step 504.

Going back to test of step 505 in case the test result is positive (branch Yes), then the variable D is added to the POP field of the variable FTCR on step 510.

Next, on step 511, a test is performed to check if the POP field of FTCR is equal to zero. If it is the case (branch Yes) then control is given to step 512, otherwise (branch No) the process loops to step 506.

On step 512, the record FTCR is removed from the FT table and the process goes back to step 506.

Going back to the test of step 508 in case the test result is positive (branch Yes), then a new test is performed on step 513 to check if variable F is equal to F1. If it is the case (branch Yes) then control is given to step 514 to set variables F and D to their next value (F2 and 1 in the example) and the process loops back to step 503. If the result of the test is negative (branch No), then the process ends (step 515), and the mail is moved to the selected folder.

Figure 6:
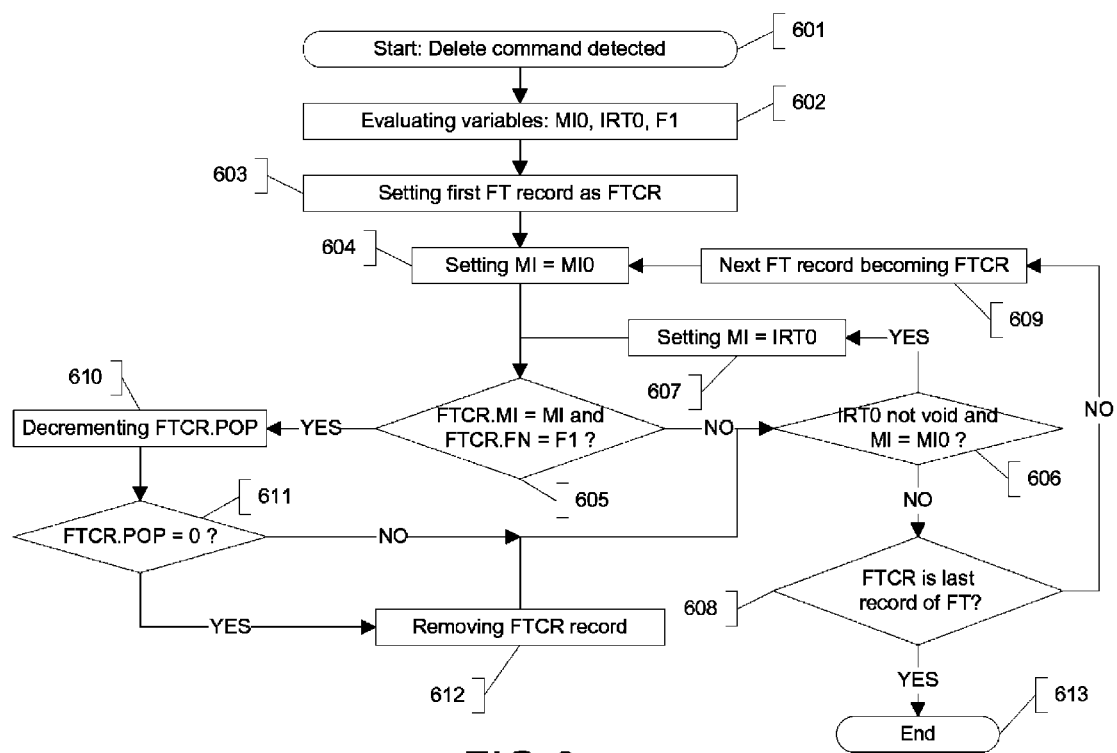
FIG. 6 is a flowchart of the process for deleting a mail from one folder according to a preferred embodiment.

FIG. 6 is a flow chart showing the steps of the process for deleting a mail from a folder according to the present invention.

The process starts on step 601 when a Delete command initiated by a user is detected. This command is associated to a mail referred to as the current mail or CM for short.

On step 602, several variables are evaluated or initialized, as follows:

variable MI0 which corresponds to the identifier associated to the "Message-Id" keyword found in CM;

variable IRT0 which corresponds to the identifier associated to the "In-Reply-To" keyword if it exists in CM or which is left to "void" if the "In-Reply-To" keyword is absent in CM;

a variable F1 taking the value the folder name where CM is stored.

On step 603, a local variable named Folder Table Current Record or FTCR for short is set equal to the first record of the FT table, and on step 604, the local variable MI is set equal to MI0.

Next, on step 605, a test is performed to check if the MI field of the record FTCR is equal to the local variable MI and if the FN field of FTCR is equal to F1. If it is the case (branch Yes) then control is given to step 610, otherwise (branch No) control is given to step 606.

On step 606, a new test is performed to check if the variable IRT0 is not void and if MI is equal to MI0. If it is the case (branch Yes) then control is given to step 607, otherwise (branch No) the process goes to step 608.

On step 607, the local variable MI is set equal to IRT0, and the process loops to step 605.

Going back to the test of the step 606 in case the test result is negative (branch No), a new test is performed on step 608 to check if record FTCR is the last record of the FT table. If it is the case (branch Yes) then the process ends (step 613), otherwise (branch No) control is given to step 609.

On step 609, the local variable FTCR is set equal to the next record of the FT table and the process loops to step 604.

Going back to the test of the step 605 in case the test result is positive (branch Yes), then the POP field of the record FTCR is decrement by 1 on step 610.

On next step 611, a new test is performed to check if the POP field of the record FTCR is equal to zero. If it is the case (branch Yes) then control is given to step 612, otherwise (branch No) the process loops to step 606.

On step 612, the record FTCR is removed from the FT table, and the process loops to step 606.

It has to be appreciated that while the invention has been, particularly shown and described with reference to a preferred embodiment, various changes in form and detail may be made therein without departing from the spirit, and scope of the invention, as illustrated in the following alternate embodiments.

The proposed method and system can be easily extended to take into account the keyword "References" appearing in the header of a mail, in a similar, if not identical, way as the explained above for the "In-Reply-To" keyword.

The Folder Table can be enhanced for recording some time stamp information in order to discriminate between a recent mail and an old mail. Doing so, more weight could be attributed to fresh mails than to old ones, so that the determination of the most relevant folders can be based on most recent user activity.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer implemented method of filing an electronic mail (e-mail) comprising the steps of:
   detecting an instruction from a user action to file the e-mail;
   extracting content of at least one message field from a header of the e-mail;
   using, by a computer, at least some of the extracted content as a message identifier to search into a folder table for one or more records associated with the same message identifier, each record of the folder table being defined by a folder name and a message identifier; and
   displaying a proposed folder list as being a result of relevant one or more folders where to file the e-mail, the list including a folder name of each record found,
   wherein the extracted content is content of a message-id field, the content of a message-id field having a unique identifier which refers to current version of current message, and
   wherein the extracted content further comprises content of a reply-to field, the reply-to field having a message-id of a previous message which current message is a reply to.

2. The method of claim 1, further comprising after the step of displaying, selecting one folder name to allow the storage of the e-mail into the corresponding folder.

3. The method of claim 1, wherein each record of the folder table further being defined by the number of e-mails stored in the corresponding folder.

4. The method of claim 3, further comprising before the step of displaying, sorting the records found based on the number of e-mails stored in each corresponding folder.

5. The method of claim 1, wherein the e-mail is an electronic mail received by the user.

6. The method of claim 1, wherein the e-mail is an electronic mail sent by the user.

7. A program storage device readable by machine, tangibly embodying a program of instructions executable by the machine to perform a method of filing an electronic mail (e-mail) comprising:
   detecting an instruction from a user action to file the e-mail;
   extracting content of at least one message field from a header of the e-mail;
   using at least some of the extracted content as a message identifier to search into a folder table for one or more records associated with the same message identifier, each record of the folder table being defined by a folder name and a message identifier; and
   displaying a proposed folder list as being a result of relevant one or more folders where to file the e-mail, the list including a folder name of each record found,
   wherein the extracted content is content of a message-id field, the content of a message-id field having a unique identifier which refers to current version of current message, and
   wherein the extracted content further comprises content of a reply-to field, the reply-to field having a message-id of a previous message which current message is a reply to.

8. The program storage device of claim 7, further comprising after the step of displaying, selecting one folder name to allow the storage of the e-mail into the corresponding folder.

9. The program storage device of claim 7, wherein each record of the folder table further being defined by the number of e-mails stored in the corresponding folder.

10. The program storage device of claim 9, further comprising before the step of displaying, sorting the records found based on the number of e-mails stored in each corresponding folder.

11. A system for filing an electronic mail (e-mail) comprising:
    a computer;
    a user graphical interface detecting an instruction from a user action to file the e-mail;
    a mail user agent extracting content of at least one message field from a header of the e-mail;
    the mail user agent using at least some of the extracted content as a message identifier to search into a folder table for one or more records associated with the same message identifier, each record of the folder table being defined by a folder name and a message identifier; and
    the user graphical interface displaying a proposed folder list as being a result of relevant one or more folders where to file the e-mail, the list including a folder name of each record found,
    wherein the extracted content is content of a message-id field, the content of a message-id field having a unique identifier which refers to current version of current message, and
    wherein the extracted content further comprises content of a reply-to field, the reply-to field having a message-id of a previous message which current message is a reply to.

12. The system of claim 11,
    the graphical user interface enables selecting one folder name to allow the storage of the e-mail into the corresponding folder, after the step of displaying.

13. The system of claim 11, wherein each record of the folder table further being defined by the number of e-mails stored in the corresponding folder.

14. The system of claim 11, wherein the e-mail is part of an e-mail network using SMTP protocol and the system is located on a mail user agent.

* * * * *